UNITED STATES PATENT OFFICE.

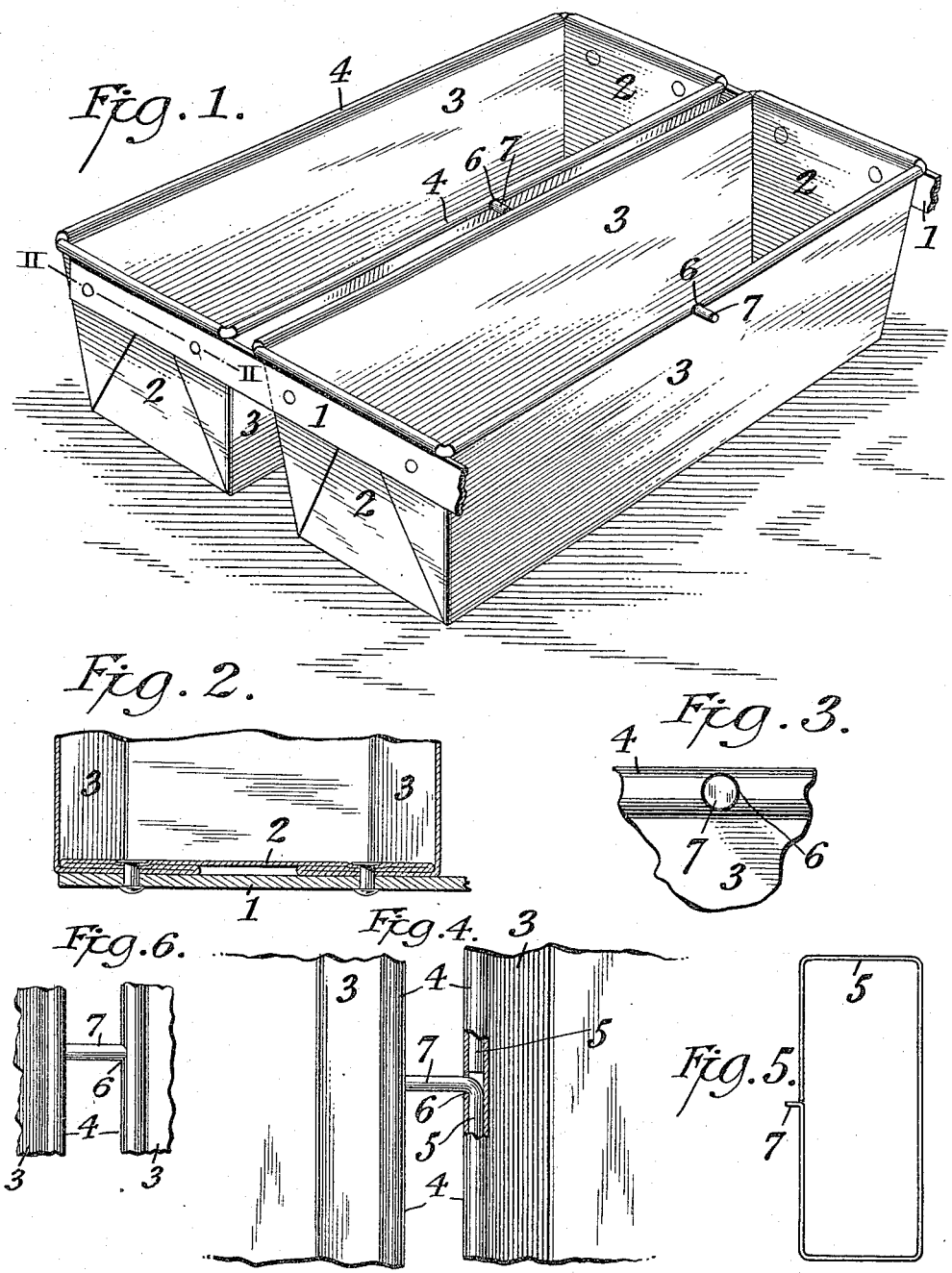

EDWARD BIGGS, OF NEW YORK, N. Y., ASSIGNOR TO WOOD & SELICK, OF NEW YORK, N. Y., A CORPORATION OF NEW JERSEY.

MULTIPLE-BAKE-PAN SET.

1,183,524.  Specification of Letters Patent.  Patented May 16, 1916.

Application filed June 24, 1914. Serial No. 846,920.

*To all whom it may concern:*

Be it known that I, EDWARD BIGGS, a citizen of the United States, residing at West New Brighton, in the borough of Richmond, city and State of New York, have invented the following-described Improvements in Multiple-Bake-Pan Sets.

The improvement consists in the structure and assemblage of a series of bake pans, such as used by bakers in baking loaves of bread or cake, and comprises a simple, cleanly and efficient means for spacing and bracing the side walls thereof, which can be incorporated in the structure of the pans at trifling cost and without additional parts, and which will durably serve the same purposes as are now attained by more complicated and expensive structures.

In the accompanying sheet of drawings my invention is shown in its preferred form, Figure 1 being a perspective view of a portion of a bake pan set; Fig. 2 a section on line II—II of Fig. 1; Fig. 3 a detailed elevation on an enlarged scale; Fig. 4 a detailed plan partly in section; Fig. 5 a small detail of the bead wire; and Fig. 6 a bottom view of the spacer.

The set may comprise several pans, though for convenience of illustration but two are shown in Fig. 1. Each pan is formed of commercial tin plate of the weight usual for single pans, and folded into the usual bread-loaf shape, as indicated by Fig. 2, all the pans in the set being rigidly joined together in spaced relation by means of the rails 1, which are riveted to the folded end walls 2, as shown in the drawings. The series of pans is thus held together as a structural unit, to be handled as such by the baker. The open space between adjacent pans is large enough to provide adequate and uniform circulation of heat on both sides of every pan, such circulation being necessary in order that the sides of the loaves shall be uniformly browned in the baking. In such pan sets, however, the side walls 3 tend to bulge outwardly, thereby restricting the circulation of heat and as a consequence delaying the baking of the loaves on their sides, which is objectionable to the baker for obvious reasons. The bulging is due in part to the weight of the dough but principally to the strains the pan sets are subjected to under repeated handling and stacking. In order to preserve the side walls at a uniform degree of separation from end to end, I utilize a portion of the bead wire which forms a part of the reinforced rim structure of each pan, and form thereof a laterally projecting member extending from one longitudinal side wall 3 into engagement or contact with the proximate side wall of the next adjacent pan, thereby preserving the spaced relationship. The spacing member thus formed is adequately rigid for the purpose and is at the same time sufficiently slender to avoid obstructing the free circulation of the heat between the pans.

As shown in the drawings, the bead wire 5 is rolled into the margins of the pan walls, forming the usual reinforced rolled rim 4. The wire may conveniently take the shape indicated in Fig. 5, wherein it will be observed that the end portions of the wire are brought together at about the middle of one longitudinal side wall and one of the said ends is turned outwardly through a hole 6 in the rim flange forming the bracing and spacing member which is marked 7. The length of the said member is such that it normally abuts against the similarly reinforced rim of the adjacent pan and preserves it at the desired degree of separation, and by simple adjustment of the machinery in which such wire is cut from stock, the projecting length thereof may be varied as desired and without extra manipulation or different machinery. The size of the bead wire is such that, especially as incorporated in the rolled rim, its out-turned and projecting end 7 is rigidly and permanently sustained in the position indicated, the passage of the said end through the hole 6 serving not only as a reinforcement but also to avoid crevices likely to retain dough or dirt. As shown by the bottom view, Fig. 6, as well as by Fig. 4, the cylindrical spacer is the least likely to retain foreign material and can be readily cleansed when necessary. It is of course desirable that the hole 6 fits the wire as snugly as possible. Each pan of the series is similarly made with the spacer member 7 incorporated in its rim and projecting to the same extent, so that the spaces between all of the pans are uniform with each other and also uniform from end to end, it being understood, of course, that the terminal pan in the series need have no such spacer projecting from it, and that where there are only two pans, one only need have the spacer.

From the foregoing description it will be evident that the results described are accomplished by means of parts which necessarily form part of each pan structure, no additional part or material being required except that represented by the slight increase in the length of the bead wire, and no additional labor being required beyond the insertion of the spacer in the hole 6. The latter can be readily punched in the flange or rim-forming machine and the out-turning of the end of the bead wire can also be accomplished automatically, as will be apparent to any person skilled in this art. It will of course be understood, however, that the invention is susceptible of modification and variation from the specific and preferred form illustrated herein without departing from the essential principles thereof, as included in the following claims.

I claim:

1. A bake-pan set comprising a series of bake-pans joined together side by side and parallel with each other by means of rail members secured to the ends of said pans, said pans having rolled rims with bead wires inclosed therein, the bead wire having an end projecting laterally from its rim into abutting contact with the adjacent pan and serving to space apart the side portions of adjacent pans to provide free circulation of heat therebetween.

2. A bake-pan set comprising a series of parallel bake pans joined together in spaced relationship, such pans having rolled rims with bead wires inclosed therein, the said bead wire having an end projecting through a hole in the rim and into engagement with the side wall of the adjacent pan and serving to space apart the said side walls.

3. A bake-pan set comprising a series of parallel bake pans joined together in open spaced relationship by means of rail members secured to the opposite ends of said pans, one or more of the pans having its longitudinal side rim provided with a narrow projecting member extending laterally and rigidly therefrom into spacing engagement with the proximate longitudinal part of the adjacent pan and serving to maintain the side walls of the pans at a predetermined degree of separation.

4. A bake-pan set comprising a series of parallel bake pans joined together in open spaced relationship by means of rail members secured to the ends of said pans, one or more of the pans having a longitudinal side rim containing a bead wire and said bead wire having a part extending laterally and rigidly from its said rim into spacing engagement with the proximate longitudinal part of the adjacent pan and serving to maintain the side walls of the pans at a predetermined degree of separation.

In testimony whereof, I have signed this specification in the presence of two witnesses.

EDWARD BIGGS.

Witnesses:
H. G. KIMBALL,
G. A. TAYLOR.